United States Patent [19]

Robertson et al.

[11] 4,318,415

[45] Mar. 9, 1982

[54] APPARATUS FOR REMOVING CORN FROM COB

[75] Inventors: George H. Robertson, Berkeley; Daniel F. Farkas, Piedmont, both of Calif.

[73] Assignee: The United States of America as represented by the Secretary of Agriculture, Washington, D.C.

[21] Appl. No.: 187,380

[22] Filed: Sep. 15, 1980

[51] Int. Cl.[3] ............................................ A01F 11/06
[52] U.S. Cl. ..................... 130/8; 130/30 J; 130/9 R; 130/33
[58] Field of Search .............. 130/8, 33, 30 J, 9 R; 426/481, 482, 483

[56] References Cited

U.S. PATENT DOCUMENTS

| | | | |
|---|---|---|---|
| 22,894 | 2/1859 | Rowe | 130/30 J |
| 226,627 | 4/1880 | Ricker | 130/8 |
| 1,055,987 | 3/1913 | Carpenter | 130/33 |
| 1,307,322 | 6/1919 | St. Clair | 130/30 J |
| 1,334,708 | 3/1920 | Maull | 130/30 J |
| 1,960,737 | 5/1934 | Galley et al. | 130/30 J |
| 3,508,556 | 4/1970 | Kaminski | 130/8 |
| 3,631,861 | 1/1972 | Skahill | 130/8 |
| 4,107,340 | 8/1978 | Robertson et al. | 426/483 |
| 4,201,227 | 5/1980 | Al-Jalil | 130/8 |

*Primary Examiner*—Paul J. Hirsch
*Attorney, Agent, or Firm*—M. Howard Silverstein; David G. McConnell; Margaret A. Connor

[57] ABSTRACT

An apparatus for removing intact kernels of corn from the cob is described. The apparatus of the invention includes a frame with friction means attached thereto for removing whole, intact kernels of corn from the cob. Also attached to the frame are means for driving the friction means and means for maintaining the friction coefficient of the friction means.

In the apparatus of the invention an ear of corn is contacted with the driven friction means so that the frictional force pushes the kernels at or near the natural abscission layer to detach the kernels intact. The means for maintaining the friction coefficient of the friction means maintains the friction coefficient at a level sufficient to detach intact kernels and preferably at a level which maximizes the efficiency of kernel detachment.

10 Claims, 10 Drawing Figures

APPARATUS FOR REMOVING CORN FROM COB

BACKGROUND OF THE INVENTION

1. Field of the Invention

This invention relates to and has among its objects the provision of a novel apparatus for removing fresh intact kernels of corn from the supporting cob. Further objects of the invention will be evident from the following description wherein parts and percentages are by weight unless otherwise specified.

2. Description of the Prior Art

Two methods are known for separating corn from the cob. The only commercial method is by cutting. In this method, ears of corn are forced end-wise against stationary or rapidly revolving concentric blades. In order to cleanly cut the kernels from the cob and at the same time reduce the inclusion of chaff from the cob, the upper part of the kernel is severed from the lower portion, which remains on the cob. No intact kernels are obtained by this method and the portion (20 to 30%) of the kernel remaining attached to the cob including much or all of the germ is wasted. The cut kernels obtained are unsuitable for fresh storage; in addition, cutting of the intact kernel causes reduction of the nutritional value and sensory properties.

Furthermore, during subsequent wet-processing, including washing and blanching of the severed kernels, part each kernel is leached from its pouch and lost. Not only is this loss economically detrimental, but a significant pollution problem is created. First of all, about 24 kg of water is used to process each kg of edible corn. Secondly, the biological oxygen demand (BOD) of the effluent is extremely high. Processors have been forced at great expense to treat their processing liquors prior to disposal into public waterways.

The second method for separation of kernels from the cob produces the desired intact kernels by rapidly freezing the kernels on the cob in a liquid cryogenic freezant to a depth not exceeding the abscission layer. The frozen ear is then subjected to impact and friction in a conventional field-corn shelling device whereby intact kernels are severed from the cob. The kernels are then thawed and washed of adhering freezant prior to canning or freezing for consumer use. The disadvantages of this method include: a large expenditure of energy to thaw and wash the detached kernels, high processing costs due to consumption of freezant during the freezing process, high consumption of water to wash the thawed kernels, and possible contamination of the kernels with adhering freezant.

A method of removing intact kernels of corn from the cob is disclosed in U.S. Pat. No. 4,107,340 ('340) wherein the cob is first split longitudinally, and then a force, commencing with the row adjacent to the split and advancing to adjacent rows, is applied to individual rows of kernels to remove them. No apparatus to accomplish this method was described or suggested in '340.

SUMMARY OF THE INVENTION

The invention described herein provides an apparatus for separating intact kernels of corn from the cob according to the method described in '340, and obviating the disadvantages of the commercial cutting method and the freeze-sever method of the prior art.

The apparatus of the invention includes a frame with friction means attached thereto for removing whole, intact kernels of corn from the cob. Also attached to the frame are means for driving the friction means and means for maintaining the friction coefficient of the friction means.

In the apparatus of the invention an ear of corn is contacted with the driven friction means so that the frictional force pushes the kernels at or near the natural abscission layer to detach the kernels intact. The means for maintaining the friction coefficient of the friction means maintains the friction coefficient at a level sufficient to detach intact kernels and preferably at a level which maximizes the efficiency of kernel detachment.

A device for presenting the ear to the friction developing surface to maximize the potential processing rate of the apparatus is also described.

One advantage of the invention is that the kernels are separated as intact kernels. Cut surfaces are avoided and the kernel juices are completely contained within the kernel thereby preventing transfer of these juices to the process water. In consequence of this the liquid waste effluent from washing and blanching the kernels is substantially reduced (about 80% reduction for manual feed to the apparatus). Additionally, because the hull of the kernel is not broken, the loss of valuable constituents which occurs in the handling, processing, and packaging of corn kernels in accordance with the practices of the prior art is avoided.

Another advantage is that the yield of corn solids is increased by approximately 20% on a per-kernel basis over those obtained by the cutting method; in addition, the nutritional properties are improved because none of the germ or heart of the kernel is lost. Also, the kernels have improved sensory characteristics.

Another advantage of the invention is that ears of corn of different variety, maturity, strength of kernel attachment, length, width and shape may be successfully processed.

An important advantage of the invention is that it may be practiced in the field. Since approximately two-thirds of the weight of an ear of corn is waste, much money and energy would be saved because only the removed kernels of corn would need transporting. The waste could be left in the field and used as mulch.

The process of the invention is applied to raw corn. Thus, the removed kernels are ready for freezing, canning, or fresh market use.

DESCRIPTION OF THE PREFERRED EMBODIMENTS

Figure 1:
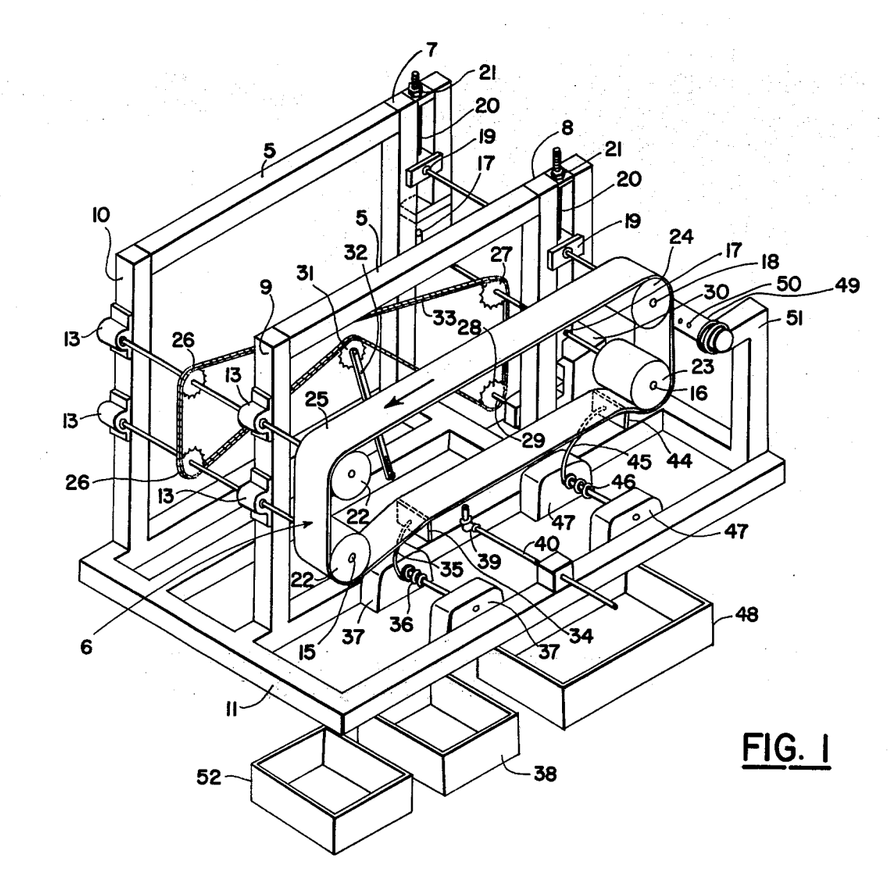
FIG. 1 is a isometric view of the apparatus of the invention taken at an angle such that the front faces toward the right.
Figure 2:
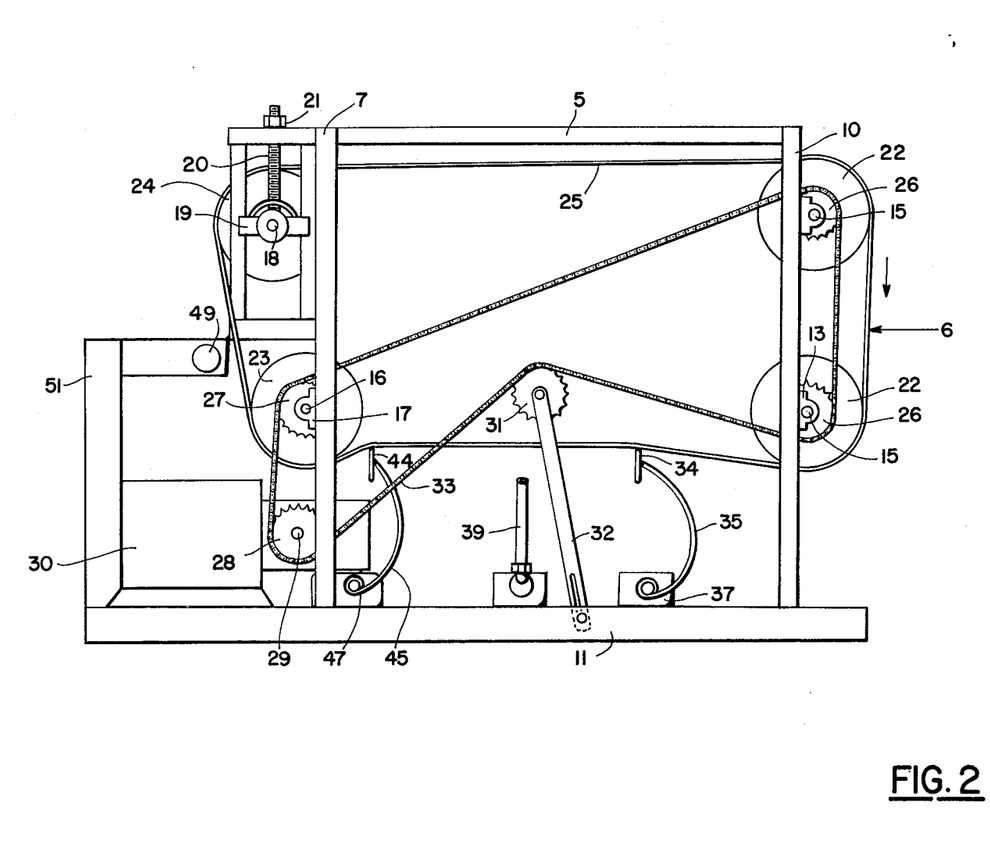
FIG. 2 is a back view of the apparatus of the invention.

Referring to FIGS. 1-2, shafts 15 are rotatively mounted through journals 13 which are fixedly attached to subframes 9 and 10. Shaft 16 is rotatively journaled by means of journals 17 which are fixedly attached to subframes 7 and 8. Shaft 18 is rotatively attached to take up bearings 19 which are fixedly attached to subframes 7 and 8. Cross bar 5 connects subframes 7 and 10 and 8 and 9. Rotatable take-up screws 20 are secured to 19 by nut 21. Subframes 7-10 are secured to main frame 11.

Pulleys 22, 23 and 24 are fixedly attached to shafts 15, 16, and 18, respectively. Endless belt 25 surrounds belt pulleys 22, 23 and 24; the surface of belt 25 is fabricated of a flexible material having a high coefficient of friction such as natural rubber, neoprene, cotton impregnated with rubber, and the like. Screws 20 are moveable so as to adjust the tension of belt 25 by adjusting the position of shaft 18 and attached pulley 24. Belt guide means known in the art may be added if desired.

Sprockets 26 and 27 are fixedly attached to shafts 15 and 16, respectively. Sprocket 28 is fixedly attached to drive shaft 29 which is driven by means of 30 which may take the form of an electric motor or the like. Motor 30 is secured to frame 11. Sprockets 26, 27 and 28 are located between subframes 7 and 8 and 9 and 10. Chain belt 33 surrounds sprockets 26, 27 and 28. Take-up sprocket 31 which communicates with chain belt 33 is rotatably mounted on upwardly projecting support member 32 which is adjustably secured to frame 11 so that the tension on chain belt 33 can be adjusted and maintained by the positioning of 31 and 32 in relation to chain belt 33.

Scraper blade 34 is fixedly attached to member 35 having spring section 36 which is fixedly attached to support member 37 secured to frame 11. Scraper blade 34 is positioned at a location following the kernel removing area generally indicated as 6 and prior to belt washer 39 to remove adhering kernel fragments and juice from the belt. Removable pan 38 is located on frame 11 at a point under scraper 34 to collect the removed fragments. Spray nozzle 39 is attached to pipe 40 which is secured to frame 11 and communicates with a water supply. Spray nozzle 39 is at a position below belt 25 to have a dispersion angle such that a uniform spray is directed at the belt so as to wash off adhering material. Scraper 44 is affixed to member 45 having spring section 46 attached to support member 47 which is secured to frame 11. Scraper 44 is located between sprayer 39 and heat manifold 49 to scrape physically-removable water and any other adhering substances from belt 25. Removable pan 48 located under scraper 44 collects the so-scraped substances and water from sprayer 39. It should be noted that scraper blades 34 and 44 may be supported by any support means as long as appropriate scraping pressure on the belt is maintained. Where belt tension is adjustable, an adjustable pressure scraper may not be necessary.

Adjacent to scraper 44 is heat distributing manifold 49 which has aperatures 50; manifold 49 is located at a distance from belt 25 to blow hot dry air on the belt so that the belt has the required high coefficient of friction when it reaches kernel removing area 6. Heat manifold 49 is secured to subframe 51 which is secured to frame 11 and subframe 8 and communicates with a source of hot air such as produced by a gas or electric heater and the like. Scraper 44 may be omitted; this, however, necessitates an increased output of energy to dry the belt.

The operation of the instant device is next described in detail with reference to FIGS. 1 and 2.

The operation of motor 30 causes sprocket 28 to rotate and drive sprockets 26 and 27 through chain belt 33. This causes shafts 15, 16 and 18 and affixed pulleys 22, 23 and 24 to rotate and thereby results in the movement of friction belt 25 in the direction of the arrow shown in FIG. 1. Appropriate chain belt tension is maintained by adjustment of the position of take-up sprocket 31 through positioning of support member 32.

Figure 9:
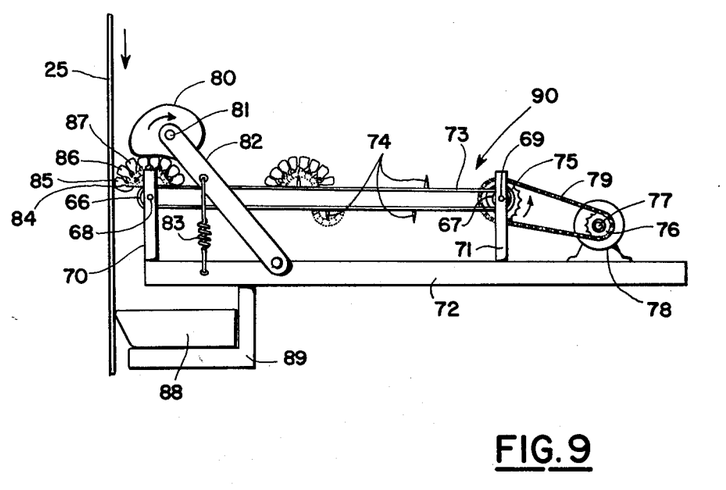
FIG. 9 is a front view of a device for presenting an ear of corn to the apparatus of the invention.

An ear of fresh corn which has been prepared so that a row of kernels is exposed on one side from tip to base by the method of '340 or the like is pressed in contact with belt 25 by hand or by the device of FIG. 9 in kernel-removing area 6 located on the side of the apparatus. The ear is oriented so that the ear long axis is substantially parallel to the belt width that is at an angle not to exceed 15 degrees.

The surface of moving belt 25 is fabricated in a continuous loop of a material having a high coefficient of friction such as natural rubber, neoprene, or similar high friction material and the tension of belt 25 is adjusted such that the frictional force developed between the moving belt and the contacted kernels is sufficient to push the kernels in a direction of the unexposed side towards the exposed side of the row and stress the kernels at or near the natural abscission layer of the kernels so they are separated as undamaged, intact kernels. The natural abscission layer is the point on the kernel at which it would naturally separate from the cob at full maturity. After the row of kernels is removed, the ear is rotated around its long axis and the next undetached row of kernels which are exposed on one side from base to tip is contacted with the friction surface of belt 25 and detached as intact kernels. The process is continued until all of the kernels have been separated. The detached kernels are collected in bin 52 located under belt 25 at kernel-removing area 6.

The speed of the belt 25 is dependent on the strength of attachment of the kernel to the supporting cob which is a function of corn variety and maturity. It should be slow enough so the frictional force developed between the friction belt surface and the contacted kernels stresses the kernels at or near the natural abscission layer between the kernel and cob so that they are detached as intact kernels and fast enough to have efficient kernel detachment. This speed can readily be determined by trial runs. The preferred belt width of this embodiment is that necessary to detach a whole row of kernels at a time or approximately 15 to 25 cm, however, it is within the compass of the invention to use narrower belts as desired. It is desirable that belt 25 is of a flexible character so that the area of contact with the kernel is increased which in turn increases the total frictional force used and decreases the possibility of kernel rupture during detachment. A particular advantage of this invention is that the strong adherence between adjacent kernels during detachment is utilized; thus kernels detached at one position cause adjacent kernels to be removed and increase efficiency of processing. The contact angle between the kernel and belt 25 is not critical in varieties of corn having loosely attached kernels. In varieties of corn having firmly attached kernels, it may be necessary to determine the optimum contact angle by trial runs.

For successful operation of the apparatus, a coefficient of friction must be maintained sufficient for kernel detachment. Friction is reduced if the juice of ruptured kernels coats belt 25. Several features are incorporated in the preferred embodiments to maintain the high friction surface which is required. These features include mechanical scraper 34 located at a point following the kernel removing area and positioned against the belt to remove silk, kernel, and husk fragments, kernel juices, and the like. The latter are collected in pan 38. Next, a water spray is directed through spray nozzle 39 which is positioned at a point below the belt to have a dispersion angle such that a uniform spray of water is directed against the belt for further cleaning. Scraper 44 positioned adjacent to the belt washing area is positioned against the belt to remove physically removable water, diluted juices, and other still-adhering material from the belt surface. Pan 48 located under scraper 44 collects the removed material. Adjacent to scraper 44 is heat distributing manifold 49 which communicates with a source of hot dry air. The hot air is directed through apertures 50 at the belt surface so that the so-heated air is dry or partially dry and has a high coefficient of friction when it reaches the kernel-removing area 6. The implementation of the cleaning, washing, and air heating section allows for control of the friction coefficient of the belt 25. Thus, high friction can be achieved by: (a) complete removal of corn juices by scraping, washing, and drying or by (b) partial removal of corn juices by scraping and partial drying. In instance (a) the natural high friction of the elastomer surface is obtained, and in instance (b) a sticky, high-friction surface based on the natural corn juices is achieved.

Figures 3, 4:
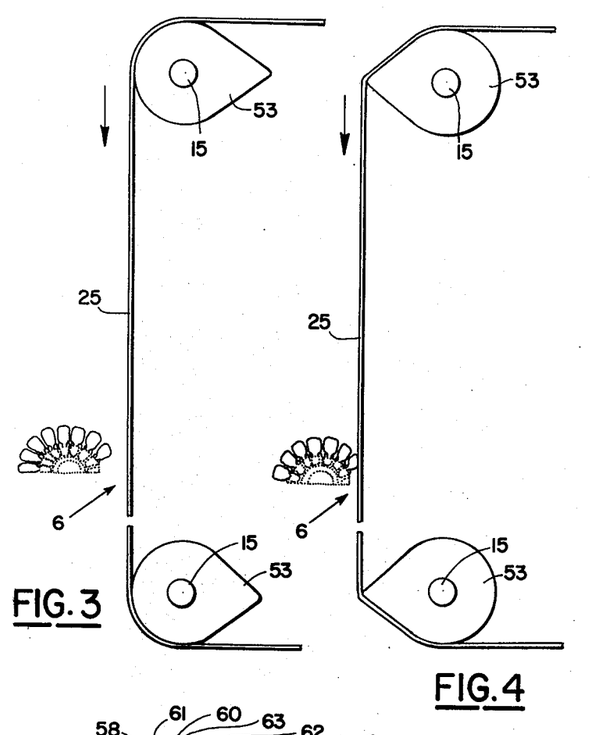
FIGS. 3 and 4 are front views of an embodiment of the apparatus showing cams in the kernel-removing area.

FIGS. 3 and 4 depict an alternate friction means using a single belt riding on cams in kernel-removing area 6 for removing whole intact kernels of corn from the cob. Cams 53 which replace pulleys 22 are fixedly attached to shafts 15 to move the belt in the kernel-removing area alternately between the normal running position (FIG. 3) and the working position (FIG. 4). In the normal running position, driven belt 25 is in contact with the non-eccentric portion of cams 53. In the working position, the cams are positioned so that the eccentric portion is in contact with the belt. In this embodiment, shafts 15 adjacent to kernel-removing area 6 work in pairs and cams 53 move in synchrony, that is the eccentric most point of cams 53 are in the same position relative to one another as shafts 15 rotate. The cams 53 are designed so that when the eccentric-most portion of the cams contacts the belt, the belt surface is extended approximately 1.9 to 2.5 cm greater than the cylindrical radius of cams 53 so that the belt at its maximum extension is extended to a point on the kernel at or near the kernel base. Thus, pressure is put on the kernel which is detached intact without damage. An important advantage of this embodiment is that the detaching frictional force is gradually applied so that rupture of the kernels is avoided, yet sufficient force is applied at full extension so that all kernels will removed. This permits ready removal of kernels in subsequent rows.

Figure 5:
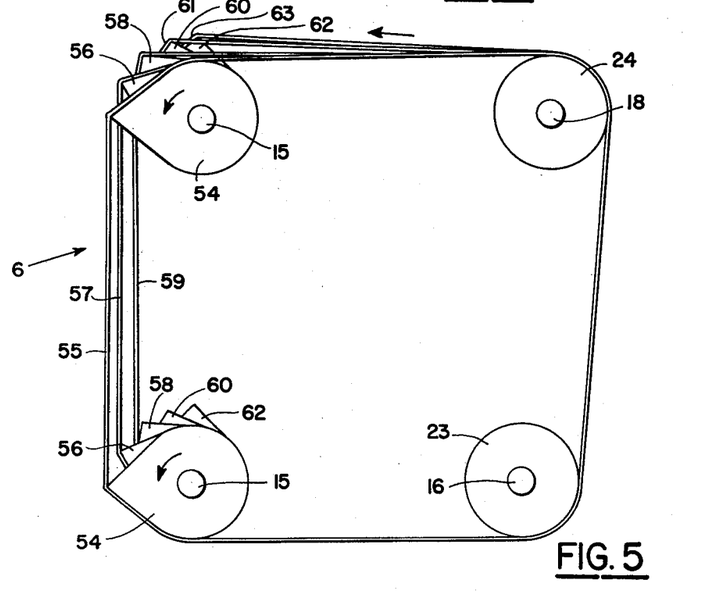
FIG. 5 is a front view of an embodiment having multiple belts and multiple cams in the kernel-removing area.
Figure 6:
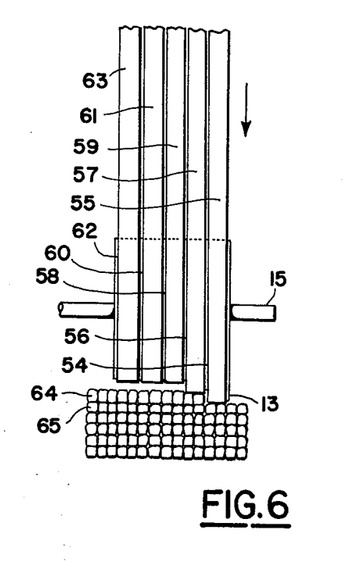
FIG. 6 is a fragmentary top view of FIG. 5 depicting a multibelt, multicam embodiment of the apparatus of the invention.

FIGS. 5 and 6 depict an alternate embodiment comprising a multiple belt arrangement for removing whole, intact kernels of corn from the cob. In this embodiment the single friction surface belt (25) of FIGS. 1-4 is replaced with several narrow, flexible, high-friction belts which are positioned on a series of cams; the belts are maintained parallel and in close proximity to one another. For purposes of illustration and not limitation FIGS. 5 and 6 are shown depicting a multibelt arrangement having five belts. In this embodiment cams 54, 56, 58, 60 and 62 are fixedly attached to shaft pair 15 located adjacent to kernel-removing area 6 and are positioned on shafts 15 so that the cam pairs (cams denoted by the same number) are in a similar position of the shaft, that is, if one shaft were superimposed on the other shaft, the cam on the first shaft would be substantially in the same position as the cam on the other shaft. Each cam pair moves in synchrony; that is, the eccentric most point of each pair is in the same position relative to one another as they rotate. In addition, cams on the same shaft are positioned in relation to the adjacent cam so that the eccentric most point of each cam achieves full extension at a time different from all the other cams on the same shaft.

Belts 55, 57, 59, 61 and 63 surround cams 54, 56, 58, 60 and 62, respectively, in the kernel-removing area and pulleys 23 and 24 at the opposite end of the apparatus. In some circumstances such as where long-lived but relatively inflexible belts such as cloth impregnated with rubber and the like are used, back pulleys 23 and 24 may be replaced with a series of cams similar to those shown in FIGS. 5 and 6. These cams will be positioned so as to keep constant tension on the belt.

Guide means to keep belts 55, 57, 59, 61 and 63 aligned on their respective cams may be used if necessary. Such guide means may consist of a any mechanical guide means known to those in the art or alternatively, the cams may be designed to taper from center to the ends so as to maintain belt alignment. Those knowledgeable in conveyor belt design are familiar with these principles.

The operation of the multibelt, multicam embodiment is next described with reference to FIGS. 5 and 6. Shaft pair 15 rotates so that the eccentric most points of cam pairs 54 are in contact with belt 55 thus extending the belt to maximum extension, approximately 1.9-2.5 cm greater than the cylindrical radius of the cams. In this position belt 55 firmly contacts kernels in row 64 and the frictional force developed between the belt and the so-contacted kernels stresses kernels at or near the natural abscission layer so that they are separated from the cob as intact kernels. Next, the rotation of shafts 15 cause cams 54 to return to the non-extended position and cams 56 to be extended so that belt 57 contacts the kernels in row 64 adjacent to the kernels just removed and detaches them by frictional force. Each pair of cams moves in sequence from the non-extended position to the extended position to contact and detach kernels in row 64. The belts are maintained substantially parallel and in close proximity to one another so that upon a complete revolution of shaft 15, substantially all of the kernels in an area equivalent to the total width of the belts is removed.

Next, the cob is rotated and the next row (65) is presented to the belts. Upon the next complete revolution of shafts 15, this next row is contacted by belts 55, 57, 59, 61 and 63 as they move into the extended position and this row of kernels is removed. The ear of corn is rotated until all rows of kernels have been removed.

The number and width of belts and cams in the multibelt, multicam embodiment can be varied depending on the variety, maturity, length and shape of the corn. In varieties of corn having very loosely attached kernels, a single belt arrangement as shown in FIGS. 1-2 can be used. In varieties having very securely attached kernels, it is preferable that several narrow, parallel, cammed belts are used so that only a few kernels are in contact with an individual belt at any one time, thus, reducing the force on the cob at any one time during kernel removal. Belt widths ranging from 1.2 to 2.5 cm or the equivalent of 2-4 kernels are preferred when removing kernels from varieties of corn having securely attached kernels; belt widths can be greater in varieties having intermediate strength of kernel attachment. It is preferable that the total width of the belts used is about the length of the ear of corn so that a whole row is removed upon a single revolution of shaft 15.

A particular advantage of using the narrow, parallel and cammed belts is that only a few kernels are in contact with the frictional belt surface at any time thus the force on the cob at any one time is greatly reduced. Consequently, the tendency of the cob to fracture is reduced and the amount of force required to support the cob against the belt is decreased. Only about 1-2 kg of force must be resisted during the dekerneling operation using a 1.5 to 2.5 cm belt, whereas a resistant force of 10 to 20 kg occurs in a 15 to 25 cm wide single belt configuration where force is applied to an entire row of kernels at one time.

Figure 7:
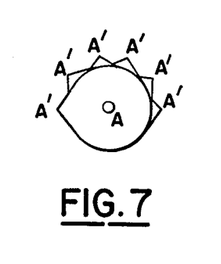
FIGS. 7 and 8 are front views of cams for processing non-tapered and tapered ears of corn, respectively.
Figure 8:
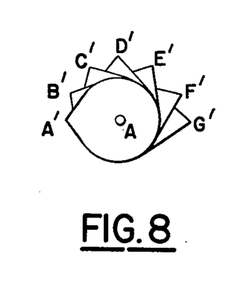

Referring to FIGS. 7 and 8, the cam pairs of the multibelt, multicam embodiment may be designed for processing non-tapered corn where the diameter of the ear from kernel to kernel is approximately invariant from shank end to tip (FIG. 7) or for processing ears of corn wherein the diameter of the ear tapers toward one end (FIG. 8). In cam unit (FIG. 7) the distance from the axis of rotation A to the most eccentric point A' is identical for each cam in the series. The cylindrical radius of the cam is not critical, however, it is preferred that the eccentric most point is approximately 1.9 to 2.5 cm greater than the cylindrical radius. In the cam unit (FIG. 8), the distance from the axis of rotation and the most eccentric point of the cam increases for each cam in the series. The first cam A-A' is the same as in FIG. 7 and the distance A-A' and is less than A-B' which is less than A-C' and so forth with A-G' being the greatest distance. This increase between each cam is such that each belt on the succeeding cam pair will be extended to contact and detach kernels attached to an ear of corn, the diameter of which tapers toward one end.

Figure 10:
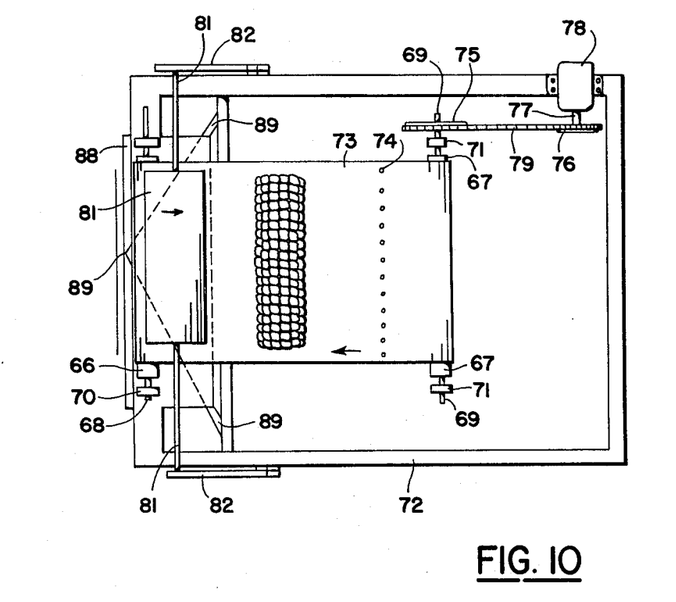
FIG. 10 is a top view of a device for presenting an ear of corn to the apparatus of the invention.

FIGS. 9 and 10 illustrate a device for feeding split ears of corn to the apparatus for removing intact kernels of corn from the cob. It may, if so desired, be attached to the main frame of the apparatus. Referring to FIGS. 9 and 10, pulleys 66 and 67 are fixedly attached to shafts 68 and 69, respectively. Shafts 68 and 69 are rotatively journaled to support members 70 and 71, respectively, which are secured to frame 72. Surrounding pulleys 66 and 67 is continuous belt 73 having upwardly projecting spikes (74) of 1.0 to 1.5 cm in length in rows substantially perpendicular to the length of the belt and at spaced intervals far enough apart so that ears placed thereon do not overlap and close enough so that optimum feeding capacity is maintained.

Sprocket 75 is fixedly attached to shaft 69; sprocket 76 is fixedly attached to drive shaft 77 which is driven by motor 78. Chain 79 surrounds sprockets 75 and 76. Pressure roller 80 is fixedly attached to shaft 81 which is rotatively mounted on support member 82. The latter is adjustably attached by means of spring 83 secured to frame 72.

In operation, split ears are placed on spikes 74 so that the ear is secured to belt 73 and the ear long axis is substantially perpendicular to the length of belt 73 and substantially parallel to width of belt 25 at point of contact. Motor 78 drives sprocket 76 through the movement of shaft 77, thereby driving chain 79 and causing sprocket 75 to rotate. This causes shaft 67 to rotate and drives belt 73 which causes 66 to rotate so a split ear is advanced towards the kernel removing area. As it approaches this area, pressure roller 80 engages the ear, firmly pressing against belt 73; simultaneously, ear 84 is firmly contacted by belt 25, such that the frictional force developed between belt 25 and the kernels of row 85 causes the kernels to be detached at the abscission layer as intact kernels. As belt 73 advances, ear 84 travels around pulley 66 so that row 86 is brought into contact with belt 25 and the kernels are detached. Rows 87, etc., are advanced until all are removed. Kernels are collected in bin 88 located on subframe 89 secured to frame 72. Feed belt 73 is maintained at a speed less than that of friction belt 25 so that the friction developed between the rows of ear 84 as they contact belt 25 will cause removal of intact kernels; feed belt speeds should be great enough, however, so that an optimum throughput of ears is obtained. When ear 84 advances to a point generally indicated as 90 around pulley 67, it is removed by the operator and another split ear attached.

The number of rows of spikes 74 is dependent on the length of belt 73 and the degree of closeness that the user desires between ears. Those skilled in the art can vary this as required. The spikes may be perpendicular to the belt or at an acute angle. The only perogative is that they secure the ear so that the rows of kernels are substantially parallel to width of belt 25 at point of contact in the kernel removing area. The spikes may be made of stainless steel or other suitable sturdy material and may be attached to belt 73 in any suitable manner such as placing the row of spikes on a metal band and riveting the belt, or attaching individual spikes to the belt, or the like.

The composition of belt 73 may be any suitable belt material such as polyethylene, polyvinylchloride and the like. Roller 80 is made of a material which will apply firm pressure to the ear of corn without damage to the kernels such as closed-cell polyurethane foam or the like. The apparatus may also be used in conjunction with the multibelt, multicam embodiment shown in FIGS. 5 and 6.

It is within the compass of the invention that more than one feed mechanism be used to feed cobs to the kernel removing area. In this case it may be necessary to add idlers as known in the art to prevent deflection of belt 25. Also, individual collecting bins to collect detached kernels could be located below each kernel-removing point.

Following separation of the kernels from the cob, the whole kernels are treated to remove cob fragments and the like. To this end the separated kernels may be screened or subjected to other suitable operation for removing such fragments. Then, the kernels are washed.

The kernels of corn may be cooked for immediate consumption, may be prepared for fresh market sale, may be preserved frozen, preferably in closed containers, or may be preserved by other conventional procedures, such as packing in a can, cooking in a pressure cooker, and the like.

The process of the invention may be applied to fresh corn, corn blanched on the cob, or to corn blanched and shell frozen on the cob either in the frozen or in the thawed state. The process may further be applied to field-dried corn.

Having thus described the apparatus, we claim:

1. An apparatus for removing whole, intact kernels of corn from the cob, which comprises:
   (a) a frame,
   (b) friction means attached to said frame for removing whole, intact kernels of corn from the cob,
   (c) means attached to said frame for driving said friction means, and
   (d) means attached to the frame for maintaining the friction coefficient of said friction means, which includes
      (1) a means for scraping the surface of said friction means,
      (2) a means for washing the surface of said friction means, and
      (3) a means for drying the surface of said friction means such that the coefficient of friction of said surface is sufficient to detach kernels of corn, intact, from the cob.

2. The apparatus of claim 1 wherein said friction means includes an endless belt.

3. The apparatus of claim 1 wherein said friction means includes a belt, the surface of the belt being fabricated of a material having a coefficient of friction such that upon contact of the belt with the kernels of corn on the cob, sufficient frictional force is developed between said belt and the kernels to cause the kernels to separate from the cob as whole, intact kernels.

4. The apparatus of claim 2 wherein said friction means includes a plurality of belts.

5. The apparatus of claim 4 wherein said belts are maintained substantially parallel and in close proximity to one another.

6. The apparatus of claim 1 which further includes means for collecting the so-removed whole, intact kernels of corn.

7. A device for feeding ears of corn to an apparatus for removing whole, intact kernels of corn from the cob, said apparatus including a friction means, which comprises:
   (a) a frame,
   (b) means attached to said frame for contacting kernels of corn with the friction means of the apparatus which means for contacting includes a belt having upwardly projecting spikes to secure the ear of corn substantially perpendicular to the length of said belt, and a means mounted over said belt for pressing the ear against said belt at the same time as the ear is contacted with the friction means, and
   (c) means attached to said frame for driving said contacting means.

8. The apparatus of claim 7 wherein the contacting means includes means for maintaining the long axis of the ear of corn substantially parallel to the width of the friction means.

9. An apparatus for removing whole, intact kernels of corn from the cob, which comprises:
   (a) a frame,
   (b) friction means attached to said frame for removing whole, intact kernels of corn from the cob,
   (c) means attached to said frame for driving said friction means which driving means includes paired shafts and a series of cams positioned so that each cam on the same shaft achieves full extension at a time different from any other cam on the same shaft and cams in similar positions on paired shafts move in synchrony, and
   (d) means attached to said frame for maintaining the friction coefficient of said friction means.

10. The apparatus of claim 9 wherein said series of cams on said shaft are constructed so that the distance from the axis of rotation to the most eccentric point of each cam is greater for each succeeding cam on said shaft by an amount sufficient to extend said friction means to contact the kernels of corn on an ear which tapers from shank to tip.

* * * * *

UNITED STATES PATENT AND TRADEMARK OFFICE
CERTIFICATE OF CORRECTION

PATENT NO. : 4,318,415
DATED : March 9, 1982
INVENTOR(S) : George H. Robertson and Daniel F. Farkas It is certified that error appears in the above—identified patent and that said Letters Patent is hereby corrected as shown below:

Column 5, line 24, delete the word "air" and
    insert -- area --.

Signed and Sealed this

First Day of June 1982

[SEAL]

Attest:

GERALD J. MOSSINGHOFF

Attesting Officer     Commissioner of Patents and Trademarks